July 24, 1923.
R. K. THOMAS
1,462,836
ROLLS FOR TENSIONING, LEVELING, AND STRAIGHTENING BAND SAWS
Filed July 13, 1921
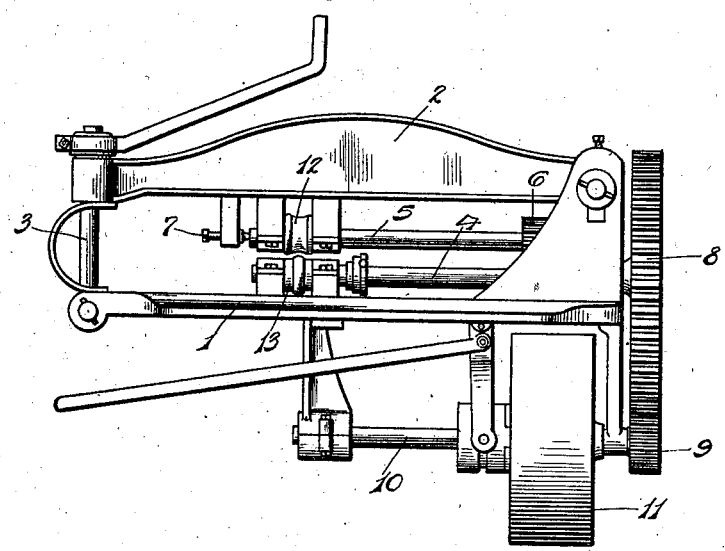
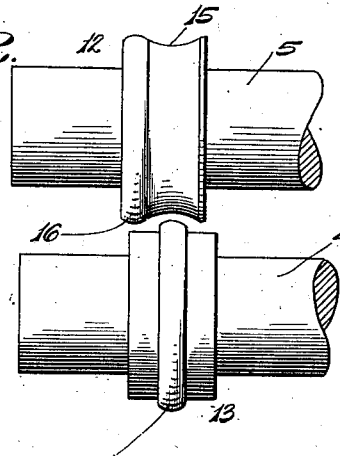
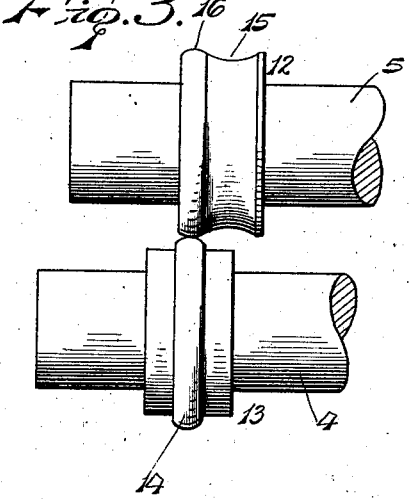
Inventor
R. K. Thomas.
By Lacy & Lacy, Attorneys Patented July 24, 1923.

1,462,836

UNITED STATES PATENT OFFICE.

RICHARD K. THOMAS, OF VICKSBURG, MISSISSIPPI.

ROLLS FOR TENSIONING, LEVELING, AND STRAIGHTENING BAND SAWS.

Application filed July 13, 1921. Serial No. 484,364.

*To all whom it may concern:*

Be it known that I, RICHARD K. THOMAS, a citizen of the United States, residing at Vicksburg, in the county of Warren and State of Mississippi, have invented certain new and useful Improvements in Rolls for Tensioning, Leveling, and Straightening Band Saws, of which the following is a specification.

My invention relates to rolls for stretching and straightening band saws without hammering and which will make the saw perfectly smooth and straight so that it will properly fit the drive pulleys and will be flat, when under strain, in the operation of sawing. The invention has special reference to the rolls employed to remove inequalities or lumps from the saw and will be hereinafter fully set forth.

In the accompanying drawings—

Figure 1 is a side elevation of a machine having my invention embodied therein;

Fig. 2 is an enlarged side elevation of the rolls showing the same in one working position; and Fig. 3 is a similar view showing the rolls in another working position.

The invention is illustrated as embodied in a machine comprising a lower stationary arm 1 and an upper arm 2 pivotally mounted upon the lower arm and held in a fixed position relative thereto by a locking bolt 3. On the upper side of the lower arm 1 is mounted a shaft 4 and on the lower side of the upper arm 2 is mounted a shaft 5, these shafts being operatively connected by gearing, indicated at 6, and the upper shaft being adjustable endwise in its bearing by an adjusting bolt or screw, indicated at 7. A gear 8 is fixed upon the outer end of the shaft 4 and receives motion from a pinion 9 on a driving shaft 10 which is mounted below the lower arm and receives motion from any convenient source of power through a band pulley 11. The parts thus generally described constitute a well-known form of machine and are illustrated in the accompanying drawings more or less conventionally.

In treating band saws to remove lumps and inequalities therefrom, it is now a very general practice to place the saws while cold upon an anvil or other firm support and play manually upon the saw with a hammer so as to beat therefrom the inequalities produced by use. It is also a custom to run the saw repeatedly through such a machine as has been described and as shown in Fig. 1, so that the saw will be subjected to pressure between a roller 12 upon the upper shaft 5 and a cooperating roller 13 upon the lower shaft 4. The rolls heretofore employed, however, have not been entirely satisfactory as they were ordinarily two plain convex presser rollers, and the primary object of my invention is to produce a pair of rolls which will more efficiently remove from the saw the objectionable lumps and inequalities. In carrying out my invention, the lower roll 13 is provided centrally with an annular rib 14, the peripheral surface of which is convex from end to end and the said roller constitutes an anvil upon which the saw will rest while it is being treated. The upper roll 12 is constructed in its peripheral surface with an annular groove 15 having a concave base and at one end has a projecting portion, the surface of which from end to end is convex, as shown at 16.

In the operation of my invention, the rolls are adjusted by moving the shaft 5 endwise so that the concave or grooved surface 15 of the upper roll will be in alinement with the convex peripheral rib 14 of the lower roll, as shown in Fig. 2, or the convex projection or rib 16 of the upper roll will be alined with the rib 14 of the lower roll, as shown in Fig. 3. The band saw rests upon a long level bench while being straightened, the top of the lower roll being flush with the surface of the bench. When the rolls are arranged as shown in Fig. 2, they will act upon the saw blade so as to remove bends and kinks and when the rolls are arranged as shown in Fig. 3, they will act upon the saw blade so as to stretch the same and impart the desired tension thereto. The most generally practiced method of removing the lumps and inequalities from band saws by hammering upon the same is a laborious time-consuming job, but by the use of my improved rolls the work can be done in about one-tenth of the time required to accomplish the results by hammering and the saw will be left in a smooth even condition without any injury to the steel. The rolls can be placed in the machines now on the market without requiring any change in the machines and without any heavy expense. The saw is passed between the two rolls and the upper roll will act upon its center and stretch it longer than at its edges and will do the work evenly and leave the blade so smooth that no break will follow. The saw is run through in this manner until the proper tension has been given it and it may then be shifted transversely so that the rolls will act thereon along another longitudinal line thereof. In straightening the saw or removing bends therefrom, the convex side of the saw is placed upon the convex roller with the concave roller opposing the concave side of the saw, so that when pressure is applied through the concave roller the saw will be forced back to a straight flat condition.

Having thus described the invention, what is claimed as new is:

In a machine for treating band saws, the combination of upper and lower rolls, one of said rolls having a single working surface which is convex in cross section to engage the saw and the other of said rolls having a working surface which is concave in cross section and also a working surface which is convex in cross section, and means for shifting one of the rolls endwise whereby either the concave surface or the convex surface of the second-mentioned roll may be brought into operative relation to the convex surface of the first-mentioned roll.

In testimony whereof I affix my signature.

RICHARD K. THOMAS. [L. S.]